Oct. 30, 1928.

W. B. COLLINS 1,689,718

STALK CUTTER AND BEDDER

Filed Oct. 16, 1926

Inventor:
W. B. Collins,
By
C. C. Hines,
Attorney.

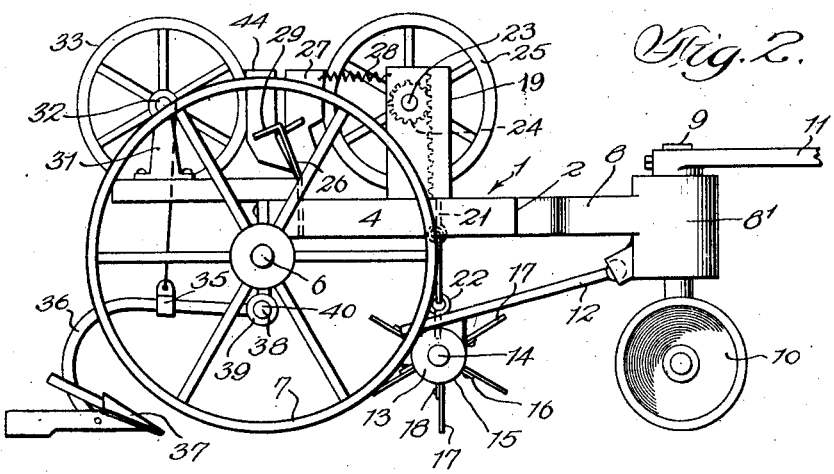
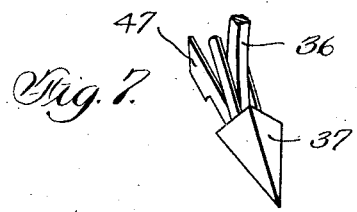
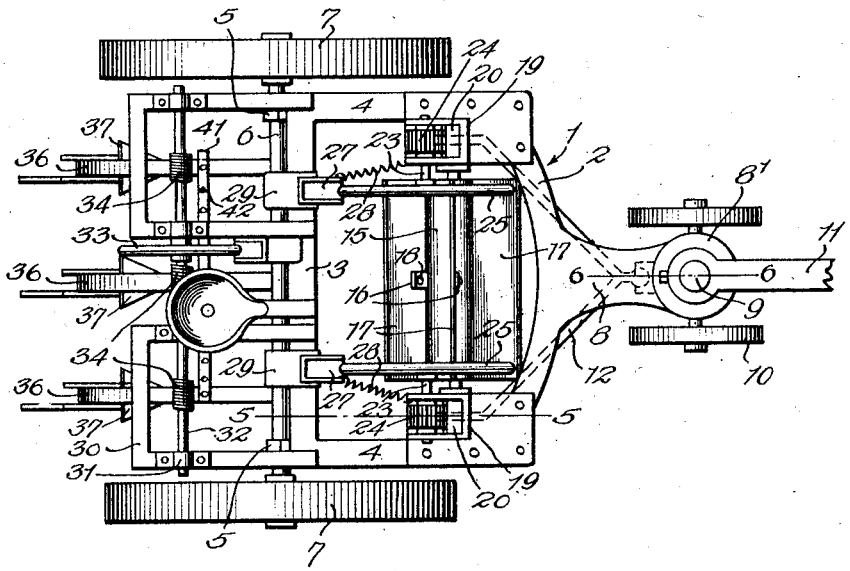

Patented Oct. 30, 1928.

1,689,718

UNITED STATES PATENT OFFICE.

WALTER B. COLLINS, OF BISHOP, TEXAS.

STALK CUTTER AND BEDDER.

Application filed October 16, 1926. Serial No. 142,018.

This invention relates to a combined stalk cutter and bedder, and one object is to provide a simple, efficient and compact construction of machine which can be easily operated and whereby a plurality of rows of stalks may be simultaneously cut and turned under and bedded at the same time the ground is broken and prepared for another crop.

Another object of the invention is to provide means whereby the cutters and plows may be easily and conveniently adjusted and held in adjusted position.

The invention consists of the features of construction, combination and arrangement of parts, hereinafter fully described and claimed, reference being had to the accompanying drawings, in which:

Figure 2 is a side elevation thereof.

Figure 3 is a top plan view.

Figure 7 is a perspective view of one of the plows.

Figure 1:
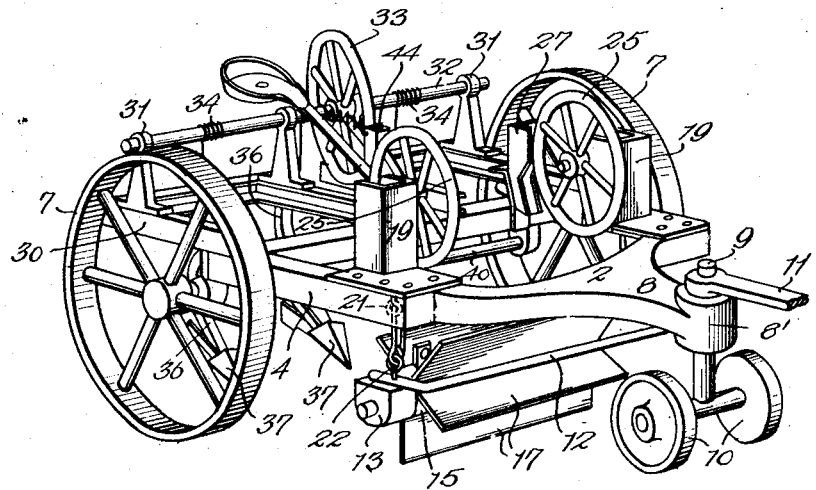
Figure 1 is a front perspective view of the device.
Figure 6:
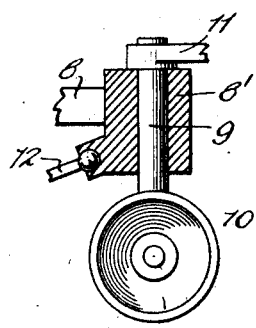
Figure 6 is a section on line 6—6 of Figure 3.
Figure 4:
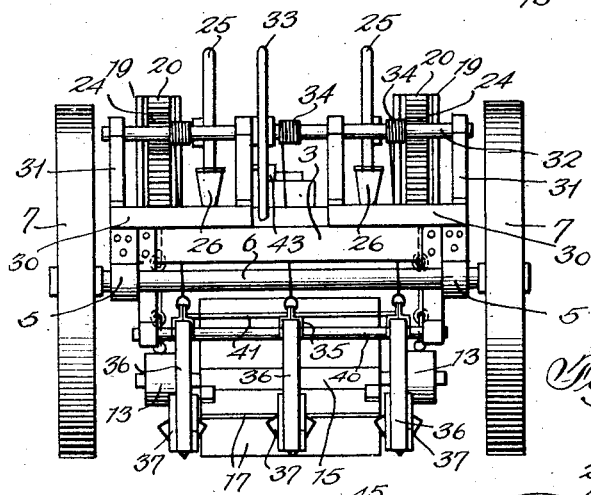
Figure 4 is a rear elevation.
Figure 5:
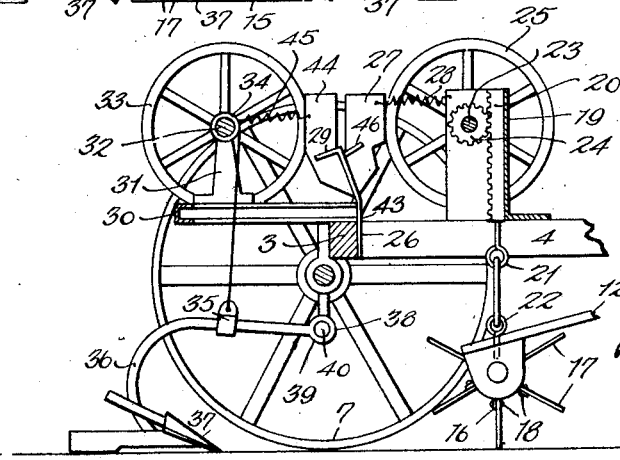
Figure 5 is a vertical section on line 5—5 of Figure 3.

Referring now more particularly to the drawings, 1 designates the main frame of the implement including a front frame bar 2, a rear frame bar 3, and side bars 4, the bar 3 being provided with clips or hangers 5 for a shaft 6 carrying rear supporting wheels 7. The bar 2 has a forwardly extending portion 8 provided with a bearing 8' for a vertical shaft or spindle 9 for a front wheeled truck 10. A draft tongue 11 is fixed to the upper end of the shaft or spindle 9 whereby the implement may be suitably drawn and steered.

Pivotally engaging the bearing 8' is a yoke 12, of substantially Y shaped design the arms of which extend rearwardly and carry bearings 13 for a transverse shaft 14, while the apex thereof pivotally engages the bearing as shown. On this shaft 14 is mounted a rotary cutter comprising a rotary drum 15 provided with lugs 16 to which detachable cutter blades 17 are secured, as by means of bolts 18. These blades are disposed at equal distances about the surface of the drum and project radially therefrom and operate to sever the standing stalks as the implement is drawn across the surface of the field and the drum revolves. The drum revolves by engagement with the stalks as the implement proceeds, thereby successively presenting its blades for a cutting action for a clean severance of the stalks without the necessity of imparting a positive rotary driving action thereto.

Extending upwardly from the main frame are gear housings 19 which may be, as shown, closed at the front and sides and open at the rear, top and bottom, and enclosed and guided in each housing is a rack bar 20. These rack bars are provided at their lower ends with suspending hooks 21 engaging screw-eyes 22 fastening the arms of yoke 12 to the bearings 13 and detachably coupling the yoke to the hooks of the rack bars. Shafts 23, journaled in the housings 19, carry pinions 24 meshing with the rack bars whereby the shaft 14, rotary cutter and swinging frame formed by the yoke 12 may be raised and lowered, to raise the cutter blades clear of the ground when the implement is being transported when not in action or to adjust the drum to vary the working level of said cutter blades. Fixed to each shaft 23 is an operating hand wheel 25 whereby the pinions may be turned to equally or unequally adjust the rotary cutter at opposite sides, the yoke being for this purpose mounted both to swing vertically and also laterally in the bearing 8'. By this means the drum may be adjusted to dispose the cutters in a horizontal position and at a desired elevation where the ground is level or the drum may be tilted laterally to incline the blades at an angle to the horizontal in working on a hillside or the like. Brake arms 26 are pivotally mounted on the frame and provided with brake shoes 27, to engage the wheels 25 whereby each wheel may be held in its cutter adjusting position. Springs 28 connect the brake arms with the housings 19 and hold the brake shoes normally applied, and each brake arm is provided with a foot pedal 29 or the like whereby it may be released.

Frame 1 carries U-shaped rear extensions 30 spaced apart at their inner sides and carrying upstanding bearing brackets 31 in which is journaled a shaft 32 carrying a hand wheel 33. Fixed at their upper ends to the shaft 32 are suspension chains 34 secured at their lower ends by cuffs 35 to plow beams 36. Three such beams are shown, each carrying a plow shovel or digger 37, to act upon a like number of rows of stalks at a time, whereby the stumps of the stalks may be uprooted and turned under into the formed furrows, so that in one and the same operation the stalks will be cut, the stumps turned under and the ground broken for the new crop. The beams 36 are pivoted, as at 38, at their forward ends to swing vertically on brackets 39, which slidably engage a transverse rod or rods 40 carried by the clips or hangers 5, admitting of a vertical adjustment of the plows to swing them clear of the ground or to regulate their depth of penetration of the ground, as well as permitting of a horizontal adjustment of the plows to regulate their spacing to accord with the spacing of the stalk rows. Overlapping spacing bars 41, secured at one end to the respective cuffs 35, and perforated for the reception of bolts 42, permit of such spacing of the beams and provide for the fastening of the beams in relatively spaced position. By means of the hand wheel 33 the chains 34 may be wound upon or unwound from shaft 32 so that the plows may be raised and lowered as required. Pivoted to bar 3 of frame 1 is a brake arm 43, similar to brake arms 26, carrying a brake shoe 44 to engage wheel 33 and held in engaging position by a spring 45, so that shaft 32 may be held fixed to hold the plow beams in adjusted position. This brake arm is provided with a pedal or like device 46 to permit it to be easily released whenever it is desired to turn wheel 33. Wheel 33 is so mounted that its bottom portion may occupy the space between frame portions 30 so that it may be arranged at a low working level and operated without interference.

The plow shovels or diggers 37 may be of any suitable construction for the purpose and sweeps 47 of suitable construction may be detachably secured to the plow standards for use or not as desired, such sweeps operating to sweep the cut stalks for a bedding action.

Having thus fully described my invention, I claim:—

1. In a stalk cutter including a wheeled supporting frame, a yoke pivoted to the frame to swing vertically and laterally, and a rotary cutter carried by and journaled upon the arms of the yoke, a combined rack guide and gear housing rising from the frame at each side thereof and above each yoke arm, a rack bar slidable vertically in each housing, a pivotal suspending connection between each rack bar and the yoke arm at the same side of the frame, a transverse shaft journaled upon each housing, a pinion on each shaft and meshing with the rack bar guided in the housing upon which the shaft is journaled, a hand wheel on each shaft, an automatically operated brake member normally engaging each hand wheel, and means for manually retracting said brake member.

2. In a stalk cutter including a wheeled supporting frame, a yoke pivoted to the frame to swing vertically and laterally, a rotary cutter carried by and journaled upon the arms of the yoke, and a combined rack guide and gear housing rising from the frame at each side thereof and above each yoke arm, a rack bar slidable vertically in each housing, a pivotal suspending connection between each rack bar and the yoke arm at the same side of the frame, a transverse shaft journaled upon each housing, a pinion on each shaft and meshing with the rack bar guided in the housing upon which the shaft is journaled, a hand wheel on each shaft, a spring actuated friction brake member normally engaging each wheel, and a foot pedal for releasing each brake member.

3. In a stalk cutter including a wheeled supporting frame, a yoke pivoted to the frame to swing vertically and laterally, and a rotary cutter carried by and journaled upon the arms of the yoke, a combined rack guide and gear housing rising from the frame at each side thereof and above each yoke arm, a rack bar slidable vertically in each housing, a pivotal suspending connection between each rack bar and the yoke arm at the same side of the frame, a transverse shaft journaled upon each housing, a pinion on each shaft and meshing with the rack bar guided in the housing upon which the shaft is journaled, a hand wheel on each shaft, brake arms on the frame and carrying brake shoes to engage the wheels, springs connecting the brake arms with the housings and operative to hold the brake shoes normally applied, and foot pedals connected to the brake arms for retracting the brake shoes.

In testimony whereof I affix my signature.

WALTER B. COLLINS.